(12) United States Patent
Turner et al.

(10) Patent No.: US 8,928,461 B2
(45) Date of Patent: Jan. 6, 2015

(54) METHOD AND SYSTEM FOR CONTROLLING RFID TRANSPONDER RESPONSE WAITING PERIODS

(75) Inventors: Christopher Gordon Gervase Turner, Oakley (GB); John McMurray, Gauteng (ZA)

(73) Assignee: ZIH Corp, Lincolnshire, IL (US)

( * ) Notice: Subject to any disclaimer, the term of this patent is extended or adjusted under 35 U.S.C. 154(b) by 1725 days.

(21) Appl. No.: 10/597,728

(22) PCT Filed: Feb. 2, 2005

(86) PCT No.: PCT/GB2005/000376
§ 371 (c)(1),
(2), (4) Date: Sep. 17, 2007

(87) PCT Pub. No.: WO2005/078646
PCT Pub. Date: Aug. 25, 2005

(65) Prior Publication Data
US 2008/0266055 A1    Oct. 30, 2008

(30) Foreign Application Priority Data
Feb. 6, 2004 (GB) .................................. 0402665.4

(51) Int. Cl.
*H04Q 5/22* (2006.01)
*G06K 19/07* (2006.01)
*G06K 7/00* (2006.01)
*G06K 7/10* (2006.01)

(52) U.S. Cl.
CPC .......... *G06K 19/0723* (2013.01); *G06K 7/0008* (2013.01); *G06K 7/10059* (2013.01)
USPC ..................... 340/10.2; 340/10.1; 340/572.1

(58) Field of Classification Search
CPC ............ G06K 7/0008; G06K 19/0723; G06K 7/10039; G06K 7/10059; G06K 7/10356
USPC .................. 340/1.1, 10.1–10.6, 572.1–572.9; 235/375–385
See application file for complete search history.

(56) References Cited

U.S. PATENT DOCUMENTS 3,961,169 A * 6/1976 Bishop et al. ................. 708/250
5,686,902 A * 11/1997 Reis et al. .................... 340/10.2
6,154,136 A * 11/2000 Van Eeden ................ 340/572.1
(Continued)

FOREIGN PATENT DOCUMENTS

WO      WO 99/26081         5/1999

OTHER PUBLICATIONS

International Search Report for International Application No. PCTGB2005/000376, completed on Apr. 20, 2005.

(Continued)

Primary Examiner — James Yang
(74) Attorney, Agent, or Firm — Alston & Bird LLP (57) ABSTRACT

The invention describes an arbitration management method and system for use in identifying RFID transponders or tags which each transmit a response signal to a reader within a respective waiting period the maximum duration of which can be adjusted. The maximum duration is determined by a random number transmitted to a counter along a number of data lines, at least one of the data lines being provided with logic gates which block or permit data line signals reaching the binary inputs of the counter to control the maximum length of the waiting period.

45 Claims, 3 Drawing Sheets

(56) References Cited

U.S. PATENT DOCUMENTS

| | | | |
|---|---|---|---|
| 6,662,068 B1* | 12/2003 | Ghaffari | 700/115 |
| 7,009,496 B2* | 3/2006 | Arneson et al. | 340/10.2 |
| 7,253,717 B2* | 8/2007 | Armstrong et al. | 340/10.2 |
| 7,511,604 B2* | 3/2009 | Raphaeli et al. | 340/10.2 |
| 2002/0063622 A1* | 5/2002 | Armstrong et al. | 340/10.31 |
| 2003/0067414 A1 | 4/2003 | Cole et al. | |
| 2003/0179078 A1* | 9/2003 | Chen et al. | 340/10.2 |
| 2003/0214389 A1* | 11/2003 | Arneson et al. | 340/10.1 |
| 2004/0198222 A1* | 10/2004 | Ertin et al. | 455/41.1 |

OTHER PUBLICATIONS

Written Opinion for International Application No. PCT/GB2005/000376, completed on May 10, 2005.

* cited by examiner

| Input 41 | Input 31 | Round Size |
|---|---|---|
| 1 | 1 | 16 |
| 1 | 0 | 8 |
| 0 | 0 | 4 |

Fig.3.

Maximum transmit delay 16 time periods (Round Size=16)

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|

Fig.4.

Maximum transmit delay 8 time periods (Round Size=8)

| 0 | 1 | 2 | 3 | 4 | 5 | 6 | 7 |
|---|---|---|---|---|---|---|---|
| 8 | 9 | 10 | 11 | 12 | 13 | 14 | 15 |

Fig.5.

Maximum transmit delay 4 time periods (Round Size=4)

| 0 | 1 | 2 | 3 |
|---|---|---|---|
| 4 | 5 | 6 | 7 |
| 8 | 9 | 10 | 11 |
| 12 | 13 | 14 | 15 |

METHOD AND SYSTEM FOR CONTROLLING RFID TRANSPONDER RESPONSE WAITING PERIODS

FIELD OF INVENTION

This invention relates to an arbitration management method for use in identification systems, more particularly, but not exclusively, in RFID systems. There is provided a method of identifying a plurality of transponders each of which transmits data at intervals to a receiver. The invention also relates to an identification system comprising a plurality of transponders and a receiver, to the transponders themselves and to an integrated circuit for use in a transponder.

BACKGROUND TO THE INVENTION

Identification systems are known in which a plurality of transmitters, typically transponders (commonly called tags), are activated by a power signal (or an "interrogation signal") and then transmit signals, usually containing identification data to a receiver, which typically forms part of the interrogator. The signals may be transmitted in many ways, including electromagnetic energy, eg. radio frequency (RF), infra red (IR), coherent light and sound, eg. ultra-sound. For example the transmission may be achieved by actual emission of RF energy by the transponders, or by the modulation of the reflectivity of an antenna of the transponder, resulting in varying amounts of RF energy in the interrogation signal being reflected or back-scattered from the transponder antenna.

Radio Frequency Identification systems are used to remotely identify, take a census of, locate or otherwise interact with people, objects or groups or clusters of people or objects. The systems usually comprise interrogators also known as readers, and transponders also known as tags.

It is not usually a problem for a reader to communicate with a single tag which is presented to the reader, such as in an access control system. However in the situation where many tags may be present in a reader's field of views, such as a crowd of people, or a pallet load of goods having tags attached, the transmissions by the tags would occur together and cause collisions, rendering the transmissions unusable due to mutual interference. A number of arbitration methods have been developed to enable a reader to sort and/or isolate and transact with these large populations of tags. These methods are known variously as anti-collision schemes or collision-arbitration algorithms. In one example described in U.S. Pat. No. 5,537,105 (corresponding to EP 494114 B1) by Marsh et al, the whole contents of which are incorporated herein, the transponders on receipt of an interrogation signal repeatedly transmit a response signal containing data which identifies the transponder. The interrogator detects successful identification of any transponder and briefly modifies the interrogation signal to indicate the successful identification. Each transponder includes a logic circuit responsive to a respective modification in the interrogation signal to cease transmission of its own response signal. The response signals are transmitted at random intervals until the identity of a transponder is successfully read and acknowledged by the reader and placed into a dormant or gagged state. U.S. Pat. No. 5,699,066 (corresponding to EP0585132) and PCT application GB98/01385 (corresponding to WO/985142) also describe methods in which the response signals are transmitted at pseudo-random intervals. The whole contents of EP0585132 and WO/985142 are incorporated herein by reference.

Other examples of such methods are described in U.S. Pat. No. 5,699,096, US2003067414 (corresponding to Cole WO 01/41043 A1), and Maletsky U.S. Pat. No. 6,104,279.

Methods have been used to improve the randomness of the response intervals. In U.S. Pat. No. 5,528,232, U.S. Pat. No. 5,640,151, U.S. Pat. No. 5,686,902 and U.S. Pat. No. 5,973,613 (all corresponding to EP 467036 B1), the whole contents of which are herein incorporated, the identification system uses a pseudo-random delay between transponder data transmissions. In this example, a linear recursive sequence generator is seeded by the transponder identification address to provide the pseudo-random delay between tag data transmissions. U.S. Pat. No. 5,550,547 describes a similar system in which the tag sends out a 64 bit ID code at intervals determined by a random number generator. U.S. Pat. No. 6,104,279 describes a system in which remote units re-transmit their bit pattern at random intervals. It further mentions that there are many techniques to produce a random number; for example the identification number can provide the seed for a random number generator permitting the user to individually seed each tag with a different random number.

Another method is based on slotted polling or slotted Aloha schemes in which tags randomly select a time slot in which to transmit and then transmit when it is their turn to do so. The theory is that because slots are randomly selected, sooner or later all tags will have had the opportunity to transmit messages 'in the clear'. WO 01/41043 describes such a system in which RFID tags randomly select a slot in which to transmit. In a practical implementation the slot selection by a tag is made on a pseudo-random basis, using a seed for a random number generator, which is derived from either part of the data held on the tag or by pre-programming a seed where the tag is manufactured. The possibility is great that many tags will have the same slot allocation choice. The fewer the number of slots to choose from, the greater will be the probability that many tags will 'randomly' select the same slot time and so will always collide and will therefore never be successfully read.

In U.S. Pat. No. 6,784,787 (corresponding to Patent Application WO99/26081), the whole of which is included herein by reference, describes a method and system for improving the reading efficiency of slotted systems by optimising the maximum waiting time before a tag (transponder) transmits or adjusts the number of slots over which a tag may randomly choose to transmit its reply. If there are too many tags in the field and the congestion is heavy, the maximum waiting time may be increased or the number of slots may be increased to relieve this congestion. The converse is also true; if there are few tags in the field and there is little or no congestion, the maximum waiting time may be decreased or the number of slots may be decreased in order to improve overall throughput. A Tag (Transponder) may dynamically alter the waiting time or number of slots over which it randomly transmits in response to an instruction from the interrogator. Alternatively, the tags (transponders) may be adapted to detect either heavy or light congestion and adjust their waiting time or slot number accordingly. Tags may increment or decrement their wait time or number of slots in increments in a number of stages or alter to any length for example number of clock pulses. The alteration of the waiting period imposes no limitation on the technique which may be used to determine the waiting time or number slots. When referring to time slots, a number of time slots are arranged in groups representing the maximum waiting time. These groups are usually referred to as Rounds. The number of time intervals contained within a maximum hold-off period can therefore be referred to as the Round Size.

Prior art systems use complex methods with fairly large logic circuits to store the Round Size value and required the slot counter to be electrically "re-wired" in order to change the count value. This results in increased chip size and power consumption.

One object of the present invention is striving to provide simpler methods of adjusting the Round Size so as to decrease chip complexity, enhance simpler operation and reduce power consumption which translates into longer read ranges.

SUMMARY OF THE INVENTION

According to one aspect of the present invention there is provided a method of identifying a plurality of transponders in an interrogation process comprising transmitting an interrogation signal to the transponders and receiving a response signal from each transponder at a time within a respective waiting period the maximum duration of which can be adjusted, characterised by creating a plurality of data line signals together defining a random number, feeding said data line signals to a counter for determining the waiting period, and providing at least one of the data lines with logic circuitry whereby control of the logic circuitry can block or permit the data line signal to the counter thereby adjusting the total number of data line signals reaching the input of the counter to control the maximum length of the waiting period.

In one embodiment the transponder uses a random or pseudo-random number generator to derive the random number, transmitting output signals from the random or pseudo-random number generator to respective inputs of the counter for determining the waiting period. Hereinafter the term "random number generator" will be used to include either a random number generator or a pseudo-random number generator.

The logic circuitry may comprise one or more logic gates, for example AND gates, the number of logic gates preferably being less than the number of data lines.

The waiting period typically consists of a plurality of smaller time intervals or time slots together defining a Round Size representative of that waiting period. There is a minimum Round Size and at least one larger Round Size, the or each larger Round Size consisting of a combination of minimum Round Sizes, whereby controlling the logic circuitry determines the number of minimum Round Sizes to be combined to define the desired larger Round Size to be used. In a binary system the maximum duration of the waiting period is increased or decreased by multiples of 2 or 0.5 respectively. Therefore, the desired Round Size is selected by increasing or decreasing the number of minimum Round Sizes to be combined, the different Round Sizes available being related to one another by factors or multiples of 2 or 0.5.

In one embodiment the step of clocking the random number generator and/or clocking the counter is by means of a clock oscillator of the transponder. The transponder transmits an output signal, from its transmitter when the counter has been counted to its terminal count, the output signal being triggered by a trigger signal from the counter, the trigger signal also triggering the counter to load a fresh or new number from the random number generator for the next count.

The maximum possible waiting time or maximum possible number of slots over which to randomise transmissions of the output signal from the transmitter is determined by the length of the counter, the data lines between the random number generator and the counter being gated in order to "fold" the counter such that the effective counter length may be modified in multiples of two.

In alternative embodiments the random number is derived by taking a snapshot of the transponder clock, or by a hash value received from the interrogator in a command.

An up or a down counter may be used whereby the terminal value of the counter is reached with the clocking signal causing the counter to either increment or decrement as required, and the output response signal contains identity or field data of a tag or transponder.

In a further aspect of the invention there is provided a transponder for generating an output signal during a waiting period, including means for deriving a random number within the transponder and delivering the random number by way of binary output signals along a plurality of data lines to a counter, characterised in that at least one of the data lines is connected to the counter via logic circuitry whereby control of the logic circuitry can block or permit the data line signal to the counter thereby adjusting the total number of data line signals reaching the input of the counter to control the maximum length of the waiting period.

In one embodiment the transponder includes a random number generator the binary output signals from which are fed to the inputs of a counter for determining the waiting period, characterised in that at least one of the output signals from the random number generator is fed via logic circuitry to a respective input of the counter whereby control of the logic circuitry adjusts the maximum length of the waiting period. Other embodiments of the transponder include the features defined in any one of the transponder claims incorporated hereinafter.

In a further aspect of the invention there is provided an identification system comprising an interrogator and a plurality of transponders, the interrogator including a transmitter for transmitting an interrogation signal to the transponders, each transponder including a receiver for receiving the interrogation signal, a transmitter for transmitting a response signal after receipt of the interrogation signal and means for generating the response signal during a waiting period, each transponder having means for altering the maximum length of the waiting period during interrogation of the transponders by the interrogator, the transponder including a random number generator the binary output signals from which are fed to the inputs of a counter for determining the waiting period, characterised in that at least one of the output signals from the random number generator is fed via logic circuitry to a respective input of the counter whereby control of the logic circuitry adjusts the maximum length of the waiting period. Other embodiments of the identification system are defined in any one of the system claims incorporated hereinafter.

The present invention further provided an integrated circuit for use in a transponder of an RFID interrogation system, the integrated circuit comprising a receiver for receiving an interrogation signal, a transmitter for transmitting a response signal after receipt of the interrogation signal, means for generating the response signal during a waiting period and control means for altering the maximum length of the waiting period, characterised by means for deriving a random number within the integrated circuit and delivering the random number by way of binary output signals along a plurality of data lines to a counter and wherein at least one of the data lines is connected to the counter via logic circuitry control of which can block or permit the data line signal to the counter thereby adjusting the total number of data line signals reaching the input of the counter to control the maximum length of the waiting period.

In one embodiment there is provided a random number generator the binary output signals from which are fed to the inputs of the counter for determining the waiting period, and logic circuitry whereby at least one of the output signals from the random number generator is fed via the logic circuitry to a respective input of the counter, control of the logic circuitry thereby providing means for adjusting the maximum length of the waiting period. Other embodiments of the integrated circuit or transponder chip are incorporated by reference to the integrated circuit claims hereinafter.

This invention provides a method of adjusting the maximum waiting period or number of slots using a minimum number of logic components. Prior art systems use more complex methods using considerably larger logic circuits to store the round size value and required the slot counter to be electrically "re-wired" in order to change the count value. This resulted in increased chip size and power consumption.

The present method provides a simple means of adjusting the round size by "folding" the counter using only few additional gates compared with a non adjustable round size device. This results in decreased chip complexity, simple operation and reduced power consumption which translates into longer read ranges.

In another embodiment transponders not already included in an active population under interrogation are arranged to enter the active population, whereupon the transponders entering the active population receive a signal from the interrogator to adjust the maximum length of their waiting period. The adjusted maximum length of the waiting period of the transponders, after arriving into an already existing active population under interrogation, is chosen to ensure transmissions from said transponders occur at an appropriate stage in the arbitration to facilitate reading of those transponders entering the active population. This is particularly advantageous when transponders are moving relative to the interrogator, for example along a conveyor belt.

In one aspect of the invention there is provided a reader for identifying a plurality of transponders, the reader comprising a transmitter for transmitting a reader signal to the transponders, a receiver for receiving response signals from each transponder at a time within a respective waiting period the maximum duration of which can be adjusted, and a processor for identifying a transponder from data in the response signal, characterised in that the reader comprises detection means for detecting the number of collisions between response signals received at the receiver and control means for controlling the reader signal to control logic circuitry connected to a counter in the transponder to adjust the maximum length of the waiting period.

DESCRIPTION OF THE DRAWINGS

The invention will be described further, by way of examples, with reference to the accompanying drawings, in which.

DESCRIPTION OF THE INVENTION

Figure 1:
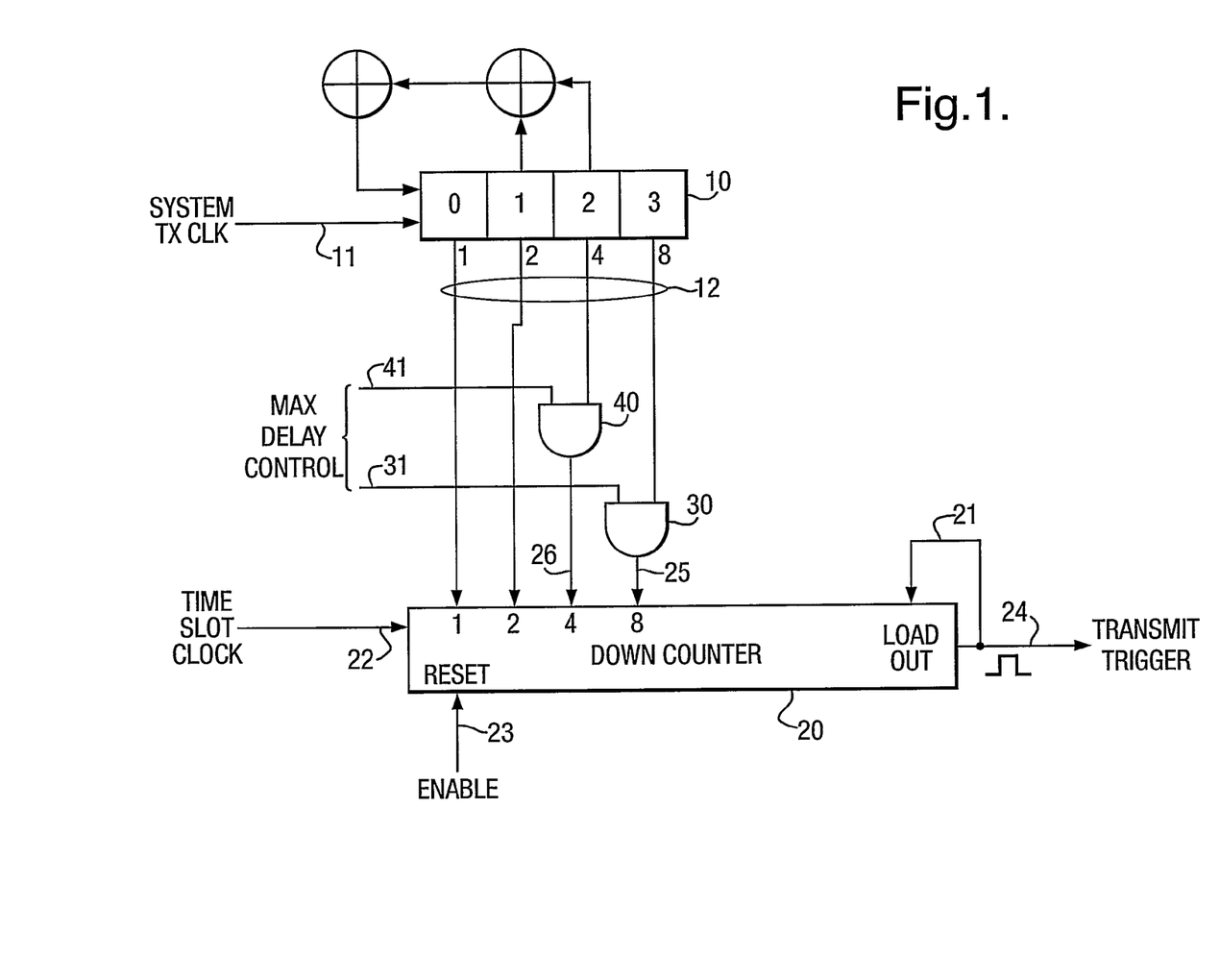
FIG. 1 is a partial schematic diagram of a logic circuit according to one embodiment of the invention.
Figure 2:
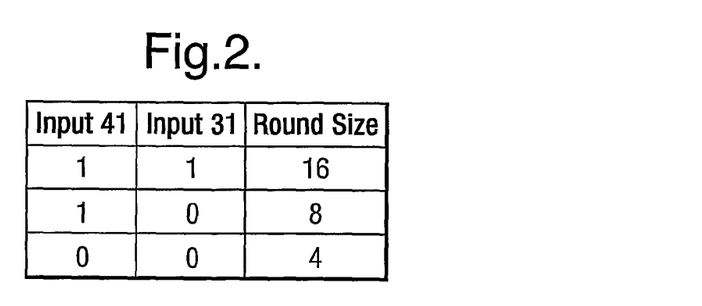
FIG. 2 is a truth diagram for the gating arrangement shown in FIG. 1.
Figure 3:
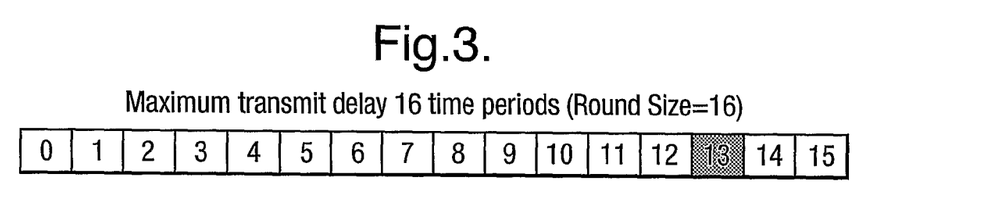
FIGS. 3, 4 and 5 show the maximum transmit delay for three different Round Sizes
Figure 4:
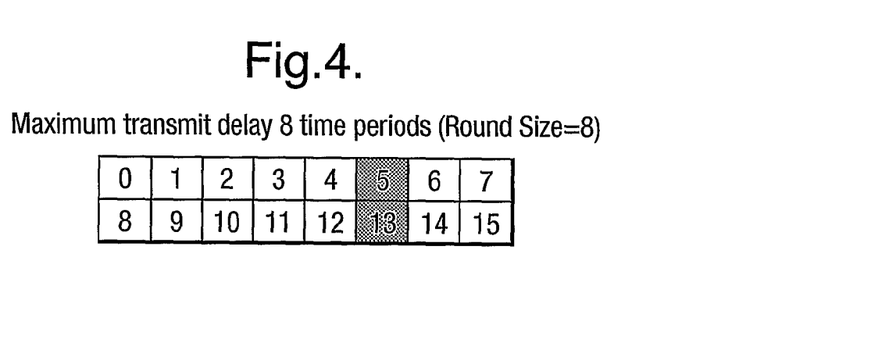
Figure 5:
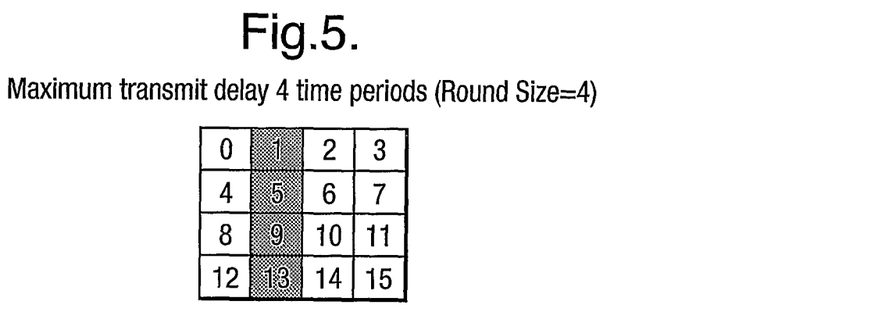

For the purposes of this description a simplified logic circuit FIG. 1 will be used to illustrate the principle. This simplified logic circuit comprises a 4 bit pseudo-random number generator (PRNG) 10, a 4 bit down counter 20 and two AND gates 30 and 40. The PRNG is driven by the system clock on input 11. The PRNG continuously generates a random number which is presented to the outputs 12, on binary lines representing weighted binary values 1, 2, 4 and 8. Binary lines 1 and 2 are routed directly to the 1 and 2 preload inputs of down counter 20. Binary lines 4 and 8 are routed first to one input of each of AND gates 40 and 30 respectively. The second input of each AND gate 41 and 31 respectively, are used to control the Round Size as shown in FIG. 2. The outputs of each of these AND gates is routed to the binary 4 and binary 8 inputs, 26 and 25 of the 4 bit down counter 20. Refer now to FIG. 3. The diagram illustrates a round having a size of 16 time intervals or slots labelled 0 . . . 15. Each of these time slots is uniquely identified by a combination of the weighted binary values 1, 2, 4 and 8 appearing on the output 12 or PRNG 10. For example slot 13 is represented by a combination of 8+4+1 or written in binary notation 1101. In FIG. 3, the 16 slots may also be represented by 4 successively concatenated blocks each having 4 time slots giving a total of 16 time slots. Refer again to FIG. 1, when the chip is enabled the system clock causes the PRNG 10 to generate a random number which is presented to the load inputs of the down counter 20. Either on receipt of an instruction from an interrogator, or on a stimulus from and internal circuit, the down counter Enable line 23 goes active and causes the down counter 20 to start counting down. The counter decrements for each input pulse from time slot clock 22. If for example the counter is preloaded with a count of '13', meaning that the chip must wait for 14 intervals before transmitting its data, or that the chip will transmit in slot 13, the counter will decrement to '0' after 14 input pulses from the time slot clock 22, the down counter 20 will output a trigger pulse 24 which causes the chip to transmit its data. This trigger pulse also connects to pre-load input 21 which causes the down counter 20 to again pre-load a new value from the PRNG 10. This new value could be for example '3' represented by binary 0011 in which case the down counter will need 4 pulses from the time slot clock before sending the output trigger pulse therefore causing the chip to transmit after a waiting period of 4 time intervals in other words it will transmit in time slot number 4. Refer now to FIG. 4. If the down counter was preloaded with '13' being slot 13, and the counter has been folded once, in other words the round size is 8, slot 13 corresponds to slot 5; or if the counter has been folded twice for a round size of 4, slot 13 now corresponds to slot 1. The folding mechanism is controlled by gating the '4' and '8' binary control lines by means of AND gate inputs 41 and 31 respectively according to the truth table in FIG. 2. These control inputs may be derived from an instruction received from an interrogator or they may be derived internal to the chip. The pre-load input 21 only occurs at the time of the first trigger output, thereby allowing a known pre-determined value to determine the maximum time hold-off time on the first transmission to take place after arbitration is enabled. This is further described below.

It will be appreciated that there may be many variants on the implementation described above. For example the random number generator may be of any required length in order to provide the desired degree of randomness. It may also be of any type or configuration. Indeed the random number may be derived from another source such as taking a snapshot of the system clock, or may be a hash value received from the interrogator in a command. The counter may be of any length as required by the transponder chip or system requirements and it may be either an up counter or down counter with the clocking signal causing the counter to either increment or decrement as required. The control input may be stored in a latch which is set by an external instruction from the interrogator and accessed by chip circuitry as required. It may also be derived internally in the chip from other information available to the chip logic, such as by the chip itself determining the degree of congestion.

In one embodiment the reader or interrogator determines the proportion of collisions occurring and the amount of white space occurring and accordingly adjusts the Round Size. As collisions increase proportional to the number of successful reads, the round size should be increased. As the proportion of white space increases in proportion to the number of successful reads the round size should be decreased.

One method of monitoring congestion might be to count the number of Acknowledgement signals (Next Slot commands in the case of ISO 18000-6) that are transmitted by the interrogator to the tag population to acknowledge the successful reading of tags. A decrease in the number of Acknowledgements could indicate that there is a high number of collisions occurring and therefore the chip needs to increase its maximum hold-off time. An increase in a number of Close Slot commands in the case of ISO 18000-6 slotted Aloha systems would indicate that there are few tags in the field because these commands are only issued when there are empty slots; these Close slot commands being counted and used to determine the relative low level of congestion, allowing the chip to reduce the maximum hold-off time intervals thereby causing the speeding up of the reading of a population of tags. It will be appreciated that other systems may not use specific Close Slot commands but may use another command which serves the same purpose, that is to reduce the amount of unproductive time in tag transmission intervals.

In another aspect of the invention, Tags that have entered a population that have not yet been included in the active group by an interrogator instruction, will have their internal prescaler 60 mechanism (see FIG. 6) or parts thereof free running but not transmitting and therefore maintaining a non-synchronised state with other tags. During this state the slot counter 20 will be maintained or held in a known state which may be all zeros or may be in another value. When the tags included in the active population by an interrogator instruction the tag will have a pre-known number of slot interval before it will do its first transmission. In this way it can be arranged that a tag transmission may occur at an early stage in the arbitration cycle thus facilitating reading of small numbers of tags moving at high speed such as on a conveyer belt or in a moving vehicle. Because the prescaler mechanism 60 has not been held in a fixed state, tags will inherently distribute their positions because of the naturally occurring drift in their clock frequencies.

Figure 6:
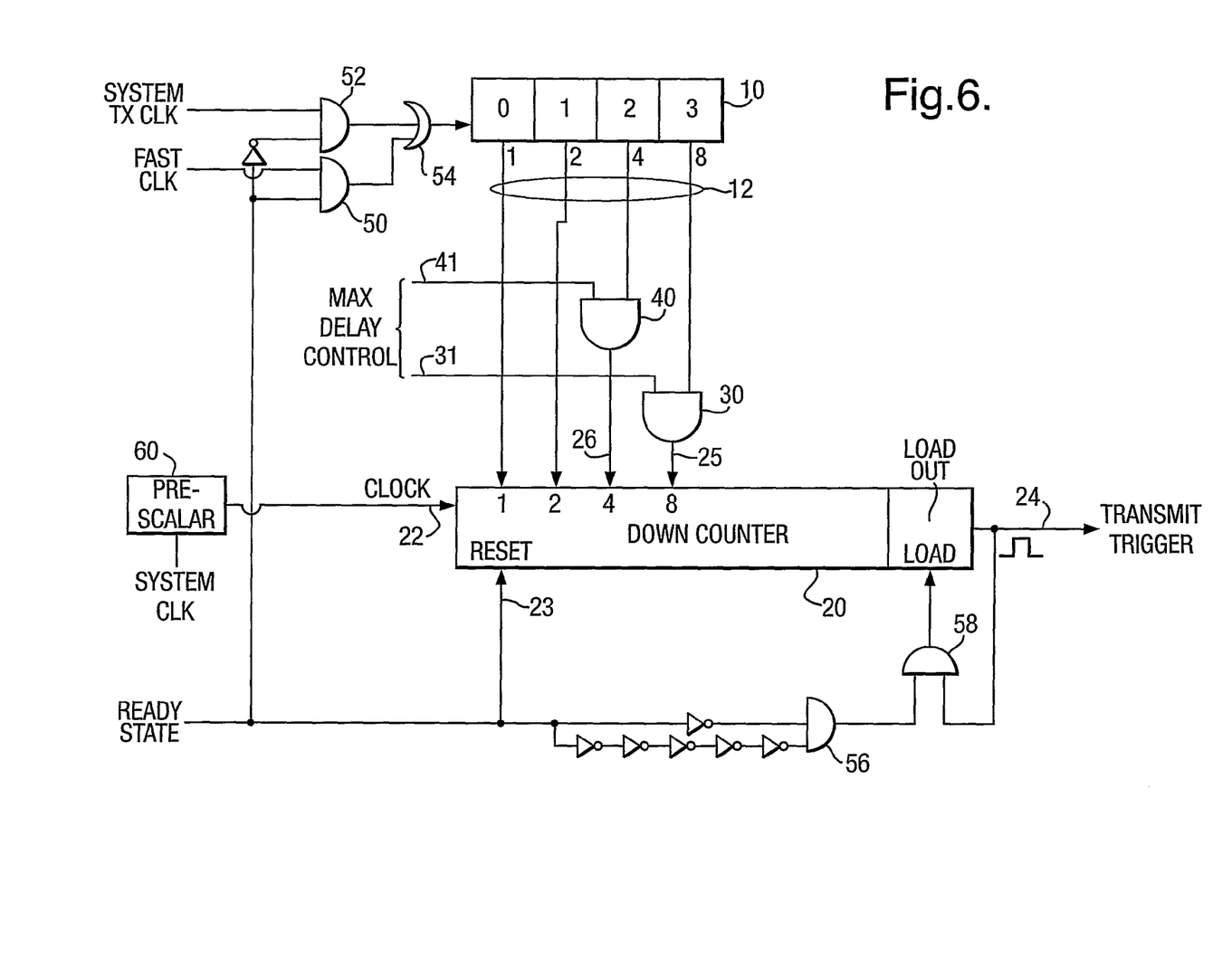
FIG. 6 is a partial schematic diagram of a further embodiment of the invention.

FIG. 6 shows a partial schematic diagram of yet another aspect of the invention, features the same as those shown in FIG. 1 being represented by identical reference numerals. In this embodiment the PRNG 10 may be switched between a Fast Clock and the Regular System Clock, the outputs of each of which are connected to inputs of respective AND gates 50,52, the other inputs of the AND gates 50,52 being connected to a Ready State signal which is also used to reset the counter 20. The outputs of the AND gates 50,52 are connected to the inputs of an OR gate 54, the output of which clocks the PRNG. The Ready State signal is also passed via an AND gate 56 to an input of a gate 58 which also receives the feedback trigger pulse signal from the output of the counter 20, causing the down counter 20 to again pre-load a new value from the PRNG 10.

The Fast Clock causes the random number to cycle much more quickly thus providing a better chance of different tags having more widely spaced randomness where tags are introduced to the RF energising field simultaneously and where their internal PRNG circuits are almost in sync. Another aspect of this embodiment is the independent Fast Load circuit which allows the counter 20 to be pre-loaded with a fast random number for the tag's first transmission in an arbitration sequence; thereafter the counter 20 is loaded with the random number generated by the System Clock.

It will be appreciated that the embodiments described here serve only to illustrate the method, system and possible implementation; that the invention is not restricted to these embodiments and that there are many other possible embodiments.

The invention claimed is:

1. A method of identifying a plurality of transponders in an interrogation process comprising:
   transmitting an interrogation signal to the transponders;
   determining a proportion of collisions and a proportion of white space;
   receiving a response signal from each transponder at a time within a respective waiting period the maximum duration of which is adjustable, wherein the transponder dynamically alters the maximum duration by at least increasing or decreasing the maximum duration based on the determined proportion of collisions and the determined proportion of white space;
   creating a plurality of data line signals at a random number generator for transmission on a plurality of data lines, the plurality of data lines providing weighted binary values that together define a random number;
   feeding said data line signals from the random number generator to a counter on respective ones of a plurality of data lines for determining the waiting period; and
   providing at least one of the data lines with logic circuitry wherein the logic circuitry is configured to control the at least one of the data lines to block or permit the respective data line signal to be received by the counter thereby adjusting a total number of data line signals reaching the input of the counter to control the maximum length of the waiting period, wherein at least one of the data lines from the random number generator is fed via the logic circuitry to a respective input of the counter.

2. A method of identifying a plurality of transponders in an interrogation process comprising:
   transmitting an interrogation signal to the transponders;
   determining a proportion of collisions and a proportion of white space;
   receiving a response signal from each transponder during a respective waiting period, a maximum duration of the waiting period being adjustable, wherein the transponder dynamically alters the maximum duration by at least increasing or decreasing the maximum duration based on the determined proportion of collisions and the determined proportion of white space; and
   for each transponder:
     transmitting output signals on respective ones of a plurality of data lines from a random number generator of the transponder to respective inputs of a counter of the transponder for determining the waiting period, at least one of the output signals from the random number generator being fed via logic circuitry to a respective input of the counter; and
     controlling the logic circuitry to adjust the maximum length of the waiting period.

3. A method as claimed in claim 1, wherein the logic circuitry comprises one or more logic gates, the number of logic gates being less than the number of data lines.

4. A method as claimed in claim 1, wherein the waiting period consists of a plurality of smaller time intervals or time slots together defining a Round Size representative of that waiting period.

5. A method as claimed in claim 4, wherein there is a minimum Round Size and at least one larger Round Size, the or each larger Round Size consisting of a combination of minimum Round Sizes, whereby controlling the logic circuitry determines the number of minimum Round Sizes to be combined to define the desired larger Round Size to be used.

6. A method as claimed in claim 1, wherein by controlling the logic circuitry the maximum duration of the waiting period is increased or decreased by multiples of 2 or 0.5 respectively.

7. A method as claimed in claim 5, wherein by controlling the logic circuitry the desired Round Size is selected by increasing or decreasing the number of minimum Round Sizes to be combined, wherein available different Round Sizes are related to one another by factors or multiples of 2 or 0.5.

8. A method as claimed in claim 2, including the step of clocking the random number generator and/or clocking the counter by means of a clock oscillator of the transponder.

9. A method as claimed in claim 8, including causing the transponder to transmit an output signal from its transmitter when the counter has been counted to its terminal count, whereupon the counter loads a fresh or new number from the random number generator for the next count.

10. A method as claimed in claim 8, comprising determining the maximum possible waiting time or maximum possible number of slots over which to randomize transmissions of the output signal from the transmitter by the length of the counter, the data lines between the random number generator and the counter being gated in order to "fold" the counter such that the effective counter length may be modified in multiples of two.

11. A method as claimed in claim 1, including deriving the random number by taking a snapshot of the transponder clock, or by a hash value received from the interrogator in a command.

12. A method as claimed in claim 1, including using either an up or a down counter whereby the terminal value of the counter is reached with the clocking signal causing the counter to either increment or decrement as required.

13. A method as claimed in claim 1, wherein the output response signal contains identity or field data of a tag or transponder.

14. A method as claimed in any claim 1, wherein transponders not already included in an active population under interrogation are arranged to enter said active population, whereupon said transponders entering the active population receive a signal from the interrogator to adjust the maximum length of their waiting period.

15. A method as claimed in claim 14, wherein the adjusted maximum length of the waiting period of the transponders, after arriving into an already existing active population under interrogation, is chosen to ensure transmissions from said transponders occur at an appropriate stage in the arbitration to facilitate reading of those transponders entering the active population.

16. A method as claimed in claim 14, wherein the transponders are moving relative to the interrogator.

17. A transponder comprising:
means for deriving a random number within the transponder; and
means for determining a proportion of collisions and a proportion of white space;
means for delivering the random number from a random number generator, by way of binary output signals, along respective ones of a plurality of data lines to a counter, wherein at least one of the data lines is connected to an input of the counter via logic circuitry, wherein control of the logic circuitry can block or permit the data line signal to the counter thereby adjusting the total number of data line signals reaching the input of the counter to control the maximum length of the waiting period by at least increasing or decreasing the maximum length of the waiting period on a dynamic basis based on the determined proportion of collisions and the determined proportion of white space, wherein at least one of the data lines from the random number generator is fed via the logic circuitry to a respective input of the counter.

18. A transponder comprising:
a random number generator configured to generate binary output signals on respective ones of a plurality of data lines which are fed to the inputs of a counter for determining the waiting period and determine a proportion of collisions and a proportion of white space, wherein at least one of the output signals from the random number generator is fed via logic circuitry to a respective input of the counter whereby control of the logic circuitry adjusts the maximum length of the waiting period by at least increasing or decreasing the maximum length of the waiting period on a dynamic basis based on the determined proportion of collisions and the determined proportion of white space.

19. A transponder as claimed in claim 17, wherein the logic circuitry comprises one or more logic gates, the number of logic gates being less than the number of data lines for the binary output signals.

20. A transponder as claimed in claim 17, wherein the waiting period consists of a plurality of smaller time intervals or time slots together defining a Round Size representative of that waiting period.

21. A transponder as claimed in claim 17, wherein there is a minimum Round Size and at least one larger Round Size, the or each larger Round Size consisting of a combination of minimum Round Sizes, whereby controlling the logic circuitry determines the number of minimum Round Sizes to be combined to define the desired larger Round Size to be used.

22. A transponder as claimed in claim 17, wherein the logic circuitry is arranged to enable the maximum duration of the waiting period to be increased or decreased by multiples of 2 or 0.5 respectively.

23. A transponder as claimed in claim 18, wherein the logic circuitry is arranged to enable the desired Round Size to be selected by increasing or decreasing the number of minimum Round Sizes to be combined, wherein available different Round Sizes are related to one another by factors or multiples of 2 or 0.5.

24. A transponder as claimed in any claim 17, wherein the transponder dynamically alters the maximum waiting time in response to an instruction from an interrogator.

25. A transponder as claimed in claim 17, wherein the transponder is adapted to detect either heavy signal congestion or large quiet signal periods and alter the maximum waiting time accordingly.

26. A transponder as claimed in claim 17, wherein the transponder is adapted to alter the maximum waiting time in response to an instruction from the interrogator or in response to external conditions present during the interrogation.

27. A transponder comprising:
a receiver for receiving an interrogation signal from an interrogator;

a processor for determining a proportion of collisions and a proportion of white space;
a transmitter for transmitting a response signal after receipt of the interrogation signal;
means for generating the response signal during a waiting period; and
a random number generator for generating binary output signals which are fed via respective ones of a plurality of data lines to inputs of a counter for determining the waiting period, wherein at least one of the output signals from the random number generator is fed via a data line having logic circuitry to a respective input of the counter, wherein control of the logic circuitry adjusts the maximum length of the waiting period by at least increasing or decreasing the maximum length of the waiting period on a dynamic basis based on the determined proportion of collisions and the determined proportion of white space during interrogation by the interrogator.

28. A transponder as claimed in claim 17, wherein the random number is derived by taking a snapshot of the transponder clock, or by a hash value received from a command from an interrogator.

29. A transponder as claimed in claim 17, wherein the counter is an up or a down counter whereby the terminal value of the counter is reached with the clocking signal causing the counter to either increment or decrement as required.

30. A transponder as claimed in claim 17, including a memory for storing an identity or data field and a modulator for transmitting the identity or data as a message in the output response signal.

31. An identification system comprising:
an interrogator, and
a plurality of transponders,
the interrogator including a transmitter for transmitting an interrogation signal to the transponders,
each transponder including:
  a receiver for receiving the interrogation signal,
  a transmitter for transmitting a response signal after receipt of the interrogation signal, and
  means for generating the response signal during a waiting period,
  each transponder having means for altering a maximum length of the waiting period during interrogation of the transponders by the interrogator and means for determining a proportion of collisions and a proportion of white space,
  the transponder further including a random number generator for generating binary output signals which are fed via respective ones of a plurality of data lines to the inputs of a counter for determining the waiting period,
    wherein at least one of the output signals from the random number generator is fed via a data line having logic circuitry to a respective input of the counter whereby control of the logic circuitry adjusts the maximum length of the waiting period by at least increasing or decreasing the maximum length of the waiting period on a dynamic basis based on the determined proportion of collisions and the determined proportion of white space detectable by the interrogator.

32. An identification system comprising:
an interrogator, and
a plurality of transponders,
the interrogator including a transmitter for transmitting an interrogation signal to the transponders,
each transponder including:
  a receiver for receiving the interrogation signal,
  a transmitter for transmitting a response signal after receipt of the interrogation signal,
  means for generating the response signal during a waiting period,
  means for determining a proportion of collisions and a proportion of white space;
  means for altering the maximum length of the waiting period during interrogation of the transponders by the interrogator,
  means for deriving a random number within the transponder and delivering the random number from a random number generator, by way of binary output signals, along respective ones of a plurality of data lines to a counter,
  wherein at least one of the data lines is connected to the counter via logic circuitry whereby control of the logic circuitry can block or permit the data line signal to the counter thereby adjusting the total number of data line signals reaching the input of the counter to control the maximum length of the waiting period by at least increasing or decreasing the maximum length of the waiting period on a dynamic basis based on the determined proportion of collisions and the determined proportion of white space, wherein at least one of the data lines from the random number generator is fed via the logic circuitry to a respective input of the counter.

33. An integrated circuit for use in a transponder of an RFID interrogation system, the integrated circuit comprising:
a receiver for receiving an interrogation signal;
a processor for determining a proportion of collisions and a proportion of white space;
a transmitter for transmitting a response signal after receipt of the interrogation signal;
means for generating the response signal during a waiting period;
control means for altering the maximum length of the waiting period;
means for deriving a random number within the integrated circuit and delivering the random number from a random number generator, by way of binary output signals, along respective ones of a plurality of data lines to a counter and wherein at least one of the data lines is connected to the counter via logic circuitry control of which can block or permit the data line signal to the counter thereby adjusting a total number of data line signals reaching the input of the counter to control the maximum length of the waiting period by at least increasing or decreasing the maximum length of the waiting period on a dynamic basis based on the determined proportion of collisions and the determined proportion of white space, wherein at least one of the data lines from the random number generator is fed via the logic circuitry to a respective input of the counter.

34. An integrated circuit for use in a transponder comprising:
a receiver for receiving an interrogation signal;
a processor for determining a proportion of collisions and a proportion of white space;
a transmitter for transmitting a response signal after receipt of the interrogation signal;
means for generating the response signal during a waiting period;
control means for altering the maximum length of the waiting period during interrogation of the transponder by the interrogator;

a random number generator for generating binary output signals which are fed via respective ones of a plurality of data lines to the inputs of a counter for determining the waiting period;

a logic circuitry, wherein at least one of the output signals from the random number generator is fed via the logic circuitry to a respective input of the counter, control of the logic circuitry thereby providing means for adjusting the maximum length of the waiting period by at least increasing or decreasing the maximum length of the waiting period on a dynamic basis based on the determined proportion of collisions and the determined proportion of white space.

35. An integrated circuit as claimed in claim 31, wherein the logic circuitry comprises one or more logic gates, the number of logic gates being less than the number of data lines for the binary output signals to the counter.

36. An integrated circuit as claimed in claim 31, wherein the waiting period consists of a plurality of smaller time intervals or time slots together defining a Round Size representative of that waiting period.

37. An integrated circuit as claimed in claim 33, wherein there is a minimum Round Size and at least one larger Round Size, the or each larger Round Size consisting of a combination of minimum Round Sizes, whereby controlling the logic circuitry determines the number of minimum Round Sizes to be combined to define the desired larger Round Size to be used.

38. An integrated circuit as claimed in claim 31, wherein the logic circuitry is arranged to enable the maximum duration of the waiting period to be increased or decreased by multiples of 2 or 0.5 respectively.

39. An integrated circuit as claimed in claim 34, wherein the logic circuitry is arranged to enable the desired Round Size to be selected by increasing or decreasing the number of minimum Round Sizes to be combined, wherein available different Round Sizes are related to one another by factors or multiples of 2 or 0.5.

40. An integrated circuit as claimed in claim 31, wherein the random number is derived by taking a snapshot of the transponder clock, or by a hash value received from a command from an interrogator.

41. An integrated circuit as claimed in claim 31, wherein the counter is an up or a down counter whereby the terminal value of the counter is reached with the clocking signal causing the counter to either increment or decrement as required.

42. An integrated circuit as claimed in claim 31, including a memory for storing an identity or data field and a modulator for transmitting the data in the output response signal.

43. A reader for identifying a plurality of transponders, the reader comprising:

a transmitter for transmitting a reader signal to the transponders;

a processor for determining a proportion of collisions and a proportion of white space;

a receiver for receiving response signals from each transponder at a time within a respective waiting period the maximum duration of which can be adjusted; and a processor for identifying a transponder from data in the response signal, wherein the reader comprises detection means for detecting the number of collisions between response signals received at the receiver and control means for controlling the reader signal to control logic circuitry configured to control at least one of a plurality of binary output signals that are fed from a random number generator via respective ones of a plurality of data lines connected to a counter in the transponder to adjust the maximum length of the waiting period by at least increasing or decreasing the maximum length of the waiting period on a dynamic basis based on the determined proportion of collisions and the determined proportion of white space, wherein at least one of the data lines from the random number generator is fed via the logic circuitry to a respective input of the counter.

44. The reader of claim 1, wherein the logic circuitry is an AND gate that controls at least one of the plurality of binary output signals that are fed from the random number generator via respective ones of a plurality of data lines based on a round size control input and a truth table.

45. The method of claim 44, wherein providing the logic circuitry includes providing the logic circuitry to control at least one of the data lines, but not all of the data lines.

* * * * *